United States Patent [19]

Seki et al.

[11] Patent Number: 4,739,429

[45] Date of Patent: Apr. 19, 1988

[54] MAGNETIC HEAD AND SUPPORT THEREFORE

[75] Inventors: Gen Seki; Seiichi Hayashi, both of Mito, Japan

[73] Assignee: Hitachi, Ltd., Tokyo, Japan

[21] Appl. No.: 769,451

[22] Filed: Aug. 26, 1985

[30] Foreign Application Priority Data

Sep. 7, 1984 [JP] Japan .................................. 59-186353

[51] Int. Cl.⁴ .................................................. G11B 21/20
[52] U.S. Cl. ..................................................... 360/104
[58] Field of Search ............................. 360/104, 103, 99

[56] References Cited

U.S. PATENT DOCUMENTS

| | | | |
|---|---|---|---|
| 3,149,337 | 9/1964 | Sliter | 360/103 |
| 3,754,104 | 8/1973 | Piper | 360/103 |
| 4,074,331 | 2/1978 | O'Reilly | 360/104 |
| 4,141,050 | 2/1979 | Wiseley | 360/104 |
| 4,328,521 | 5/1982 | Pexton | 360/104 |
| 4,379,316 | 4/1983 | Krone | 360/104 X |

Primary Examiner—A. J. Heinz
Attorney, Agent, or Firm—Antonelli, Terry & Wands

[57] ABSTRACT

A magnetic head has a slider and a recording and reproducing gap which slide-contact a magnetic disk and is pivotally supported. The recording and reproducing gap of the magnetic head is disposed so as to be offset toward the forward end of the slider in terms of the direction of rotation of the magnetic disk, whereby it is possible to obtain a stable state of contact between the recording and reproducing gap and the magnetic disk.

1 Claim, 4 Drawing Sheets

MAGNETIC HEAD AND SUPPORT THEREFORE

BACKGROUND OF THE INVENTION

The present invention relates to a magnetic recording and reproducing head for recording and reproducing signals on a flexible magnetic disk.

Almost all conventional magnetic recording and reproducing apparatus are arranged such that a flexible magnetic disk is slide-contacted by the respective sliders of two magnetic recording and reproducing heads in such a manner that the magnetic disk is interposed between the sliders, and signals are written and reproduced by a recording and reproducing or head gap which is incorporated in each of the sliders. Further, at least one of the magnetic heads in a conventional magnetic recording and reproducing apparatus has been supported by a gimbal supporting mechanism so as to be free to pivot in any direction for the purpose of stabilizing the plane contact between the associated slider and the magnetic disk.

Moreover, the head gap is generally disposed in the vicinity of the center of the slider.

Conventional apparatus of the type described above, however, suffer from the following disadvantages. Namely, since the magnetic disk and each slider are in direct contact with each other when effecting recording and reproduction, the slider is constantly subjected to the frictional resistance which occurs between the respective contact surfaces, thus causing a turning moment to act around the support point for the slider. This turning moment easily causes the contact between the magnetic disk and the slider to become unstable. In addition, the turning moment disadvantageously makes it easy for the contact between the magnetic head and the head gap of the magnetic head incorporated in the vicinity of the center of the slider to become defective. An example of the aforementioned type of conventional magnetic recording and reproducing apparatus is disclosed in Japanese Patent Unexamined Publication No. 77028/1980.

SUMMARY OF THE INVENTION

It is a primary object of the present invention to provide a magnetic head in which the contact between a magnetic disk and a slider and a head gap is maintained in a stable state, thereby allowing excellent recording and reproducing characteristics to be obtained.

In a magnetic head which has a slider and a recording and reproducing gap which slide-contact a magnetic disk and is pivotally supported, the slider is subjected to a turning moment generated as a result of the rotation of the magnetic disk, which undesirably makes it easy for the contact between the slider and the recording and reproducing gap and the magnetic disk to become unstable.

The present invention aims at eliminating the above-described undesirable phenomenon and, for this purpose, the recording and reproducing gap of the magnetic head which is conventionally provided in the vicinity of the center of the slider is disposed in a position offset from the center in the direction of rotation of the magnetic disk. As a result, it is possible to obtain a more stable contact state by virtue of the action of the above-described turning moment. Thus, it is possible to provide a magnetic head having greatly improved recording and reproducing characteristics.

DETAILED DESCRIPTION

One embodiment of the present invention will be described hereinunder with reference to the accompanying drawings.

Figure 1:
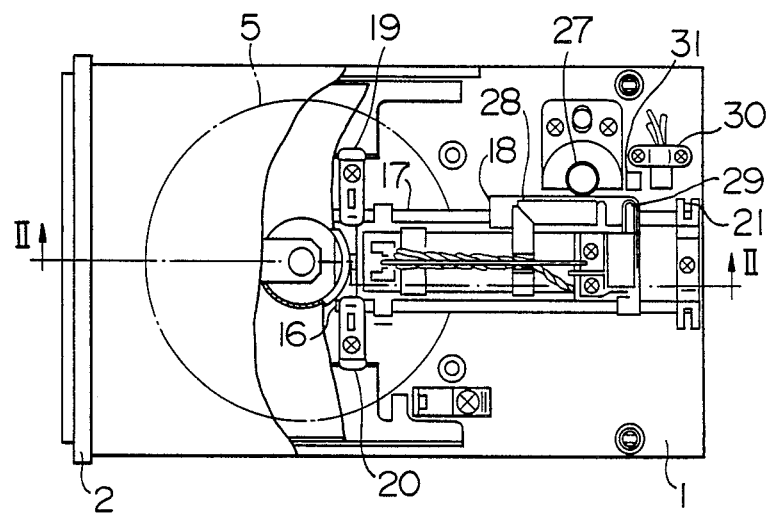
FIG. 1 is a plan view of a portion of a flexible disk-type magnetic recording and reproducing apparatus.
Figure 2:
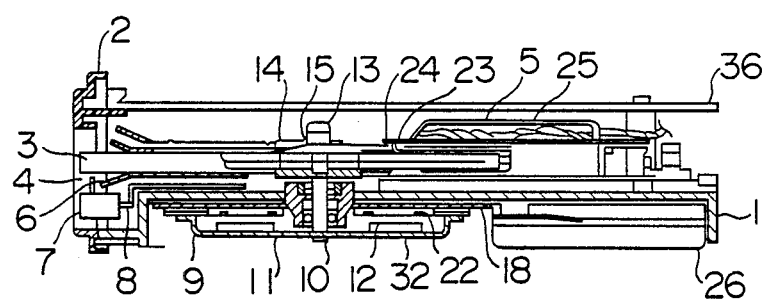
FIG. 2 is a sectional view taken along the line II—II of FIG. 1.

Referring now to the drawings wherein like reference numerals are used throughout the various views to designate like parts and, more particularly, to FIGS. 1 and 2, according to these figures, an aluminum chassis 1 is provided at a front end thereof with a synthetic resin panel 2 formed with an opening 4 for housing a synthetic resin casing 3 within the chassis 1, with a magnetic disk 5 being rotatably retained within the casing 3. A cassette holder 6 is provided within the chassis 1 and a loading of the casing 3 into the cassette holder 6 is effected by an ejection lever 8 actuated by an ejection button 7. A flat motor 9 serving as a drive source for rotating the magnetic disk 5, is provided in a central portion of the chassis 1. A printed circuit board unit 36 for controlling electric elements is secured within the chassis 1.

The flat motor 9 has a rotating shaft 10 supported by the chassis 1 through a bearing portion 11. A hub receiver 12 is secured to a distal end of the rotating shaft 10, and the hub receiver 12 has the rotating shaft 10 projecting from its upper surface so as to form a main shaft and is further provided with a driving shaft which is disposed around the main shaft.

The magnetic disk 5 is provided in a central portion thereof with a hub 13 of a synthetic resin. The hub 13 is formed with an opening for receiving the rotating shaft 10 and a retainer wall which is engaged with the driving shaft. The disk portion of the magnetic disk 5 is a thin and flexible material and is adapted to allow a plurality of recording tracks to be concentrically formed thereon by a magnetic head. The magnetic disk 5 is adapted to allow recording and reproduction to be effected on both surfaces thereof.

The cassette holder 6 is provided with a stainless steel collet lever 14 formed as a sheet. A collet 15 is pivotally supported at the distal end of the collet lever 14 so that, when the casing 3 is completely housed within the cassette holder 6, the hub 13 is clamped between the collet 15 and the hub receiver 12 by the collet lever 14. The arrangement is such that, as the flat motor 9 is rotated in a state wherein the hub 13 is clamped between the collet 15 and the hub receiver 12, the magnetic disk 5 is rotated at the same number of revolutions as that of the rotating shaft 10.

As shown in FIG. 1, a carriage 18 is provided within the chassis 1, with the carriage 18 being supported by parallel guide shafts 16, 17 so as to be movable in respective longitudinal axes thereof. The shafts 16, 17 are secured to the chassis 1 by retainer members 19, 20 and 21.

The carriage 18 carries a first magnetic head 22 retained by a support member 32, with the first magnetic head 22 being adapted to write signals onto the magnetic disk 5 and read out signals therefrom.

The carriage 18 is provided with a head arm 23, which is provided with a second magnetic head 24 which writes signals onto the magnetic disk 5 and reads out signals therefrom.

The first and second magnetic heads 22 and 24 oppose each other across the magnetic disk 5 and are brought into contact with the magnetic disk 5 with an appropriate pressing force which is applied by virtue of the resiliency of a head arm spring 25 provided on the head arm 23.

A step motor 26 for moving the carriage 18 is provided on the chassis 1. A pulley 27 is secured to the distal end of the rotating shaft of the step motor 26. A steel belt 28 is wound on the pulley 27 under tension applied by a spring 29. Both ends of the steel belt 28 are threadably secured to the carriage 18. The carriage 18 is provided with an interrupter 31 which serves to intercept light traveling toward a track sensor 30.

Figure 3:
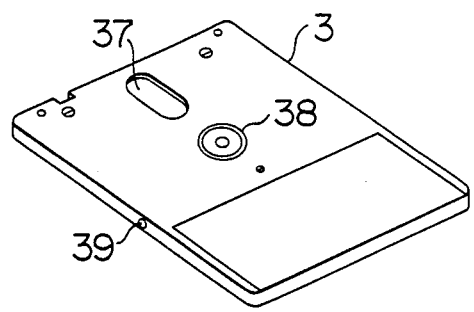
FIG. 3 is a perspective view of the casing shown in FIG. 2.

As shown in FIG. 3, the upper and lower surfaces of the casing 3 are respectively formed with slot-like openings 37 in such a manner that the openings 37 oppose each other. Further, openings 38 are respectively formed in the upper and lower surfaces of the casing 3 in such a manner as to oppose each other, with the openings 38 enabling the collet 15 or the hub receiver 12 to contact the hub 13. The openings 37 are provided for the purpose of allowing the first magnetic head 22 or the second magnetic head 24 to contact the magnetic disk 5. In an ordinary state, the openings 37 are covered with a shutter (not shown). When the casing 3 is inserted into the cassette holder 6 (see FIG. 2), a slider 39 which is provided on one side surface of the casing 3 is engaged with an engagement portion provided on the cassette holder 6, and the shutter is thereby opened to expose the magnetic disk 5.

Figure 4:
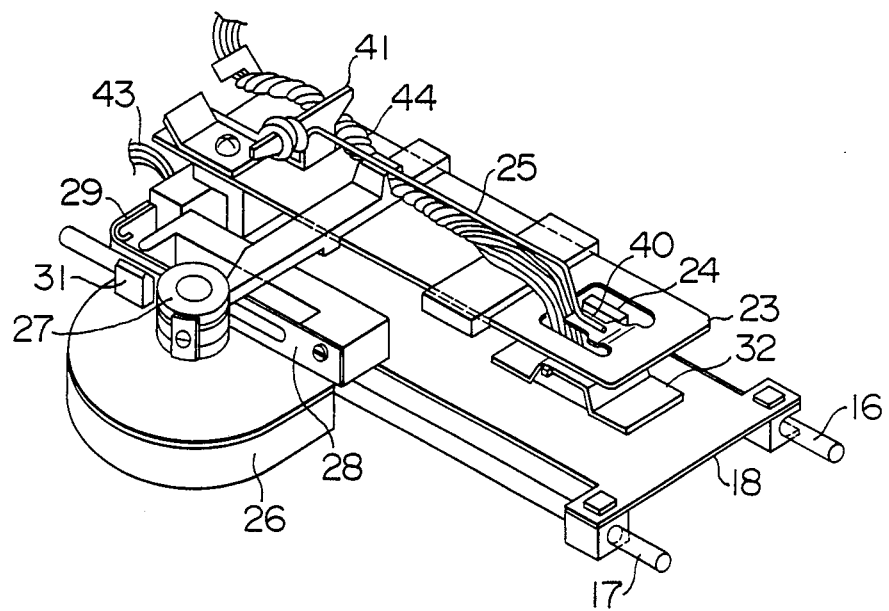
FIG. 4 is an enlarged perspective view of the magnetic head positioning mechanism section shown in FIG. 2.

As shown in FIG. 4, a magnetic head positioning mechanism section includes the step motor 26, the carriage 18, the head arm 23, the steel belt 28 and so forth.

One end of the head arm 23, formed from spring steel sheet, is threadably secured to the carriage 18, together with a support member 41, while the other end of the head arm 23 is formed so as to provide a support member 40 for the second magnetic head 24.

The first magnetic head 22 and the support member 32 therefor are disposed on the carriage 18 in such a manner so as to oppose the second magnetic head 24 across the magnetic disk 5.

The other end of the carriage 18 supports the head arm 23. Further, both ends of the steel belt 28, retained by the step motor 26, are secured to this end of the carriage 18, whereby the carriage 18 is movable along the guide shafts 16 and 17 in accordance with the rotation of the step motor 26.

A conductor 43 is connected to the first magnetic head 22, while a conductor 44 is connected to the second magnetic head 24. The other end of each of the conductors 43, 44 is connected to the printed circuit board unit 36 (see FIG. 2).

Figure 5:
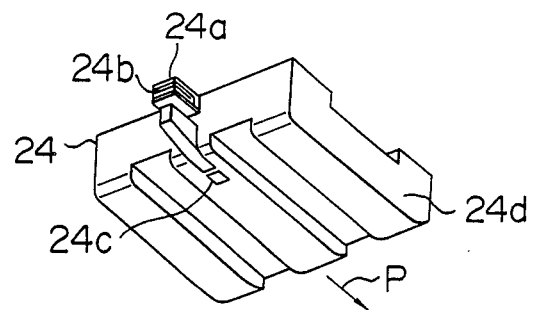
FIG. 5 is an enlarged perspective view of one magnetic head.

Referring next to FIG. 5, the second magnetic head 24 includes a core 24a for generating a magnetic field, a winding portion 24b, a head gap 24c and a slider 24d. The magnetic disk 5 is rotated in the direction of the arrow P and is brought into a sliding contact with the head gap 24c and the bottom surface of the slider 24d.

Figure 6:
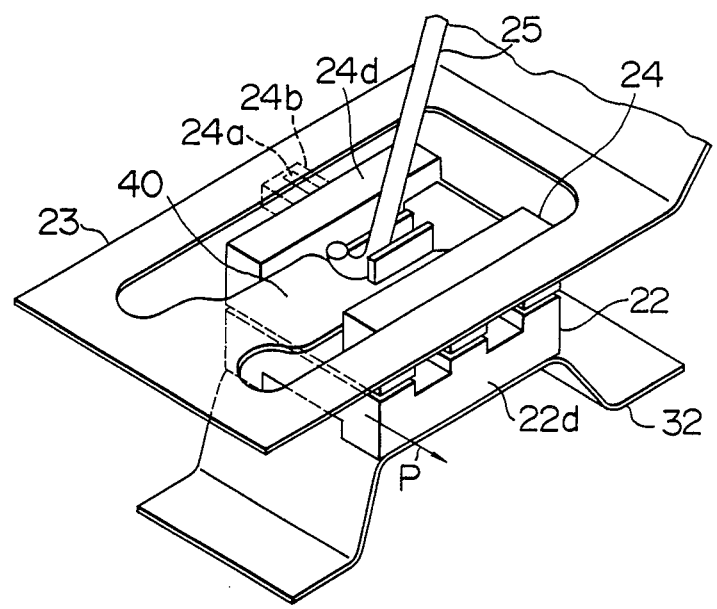
FIG. 6 is an enlarged perspective view of a magnetic head mounting section with first and second magnetic heads in a mounted state.

In this embodiment, the head gap 24c is not disposed in the vicinity of the center of the slider 24d but is offset from the center in the direction of rotation P of the disk 5. In a manner similar to the above, the first magnetic head 22 is formed so as to oppose the second magnetic head 24 across the magnetic disk 5, as shown in FIG. 6. The first magnetic head 22 also has a head gap 22c disposed at a position offset from the center of a slider 22d in the direction of rotation P of the magnetic disk 5.

As apparent from FIG. 6, the second magnetic head 24 is pivotally retained at one end of the head arm 23 by the support member 40 formed by cutting and bending a portion of the head arm 23. The first magnetic head 22 is pivotally supported by the support member 32 secured to the carriage 18.

The head arm spring 25 serves to apply a predetermined pressure to the first and second magnetic heads 22, 24 by which they are brought into resilient contact with the magnetic disk 5. As the magnetic disk 5 is rotated, the first and second magnetic heads 22, 24 are respectively subjected to turning moments $M_1$ and $M_2$ which act around the respective pivotal support points $X_1$ and $X_2$ for the support members 32 and 40 as a result of the frictional resistance which occurs between the respective bottom surfaces of the sliders 22d and 24d and the corresponding slide-contact surfaces of the magnetic disk 5 as shown in FIG. 7.

Figure 7:
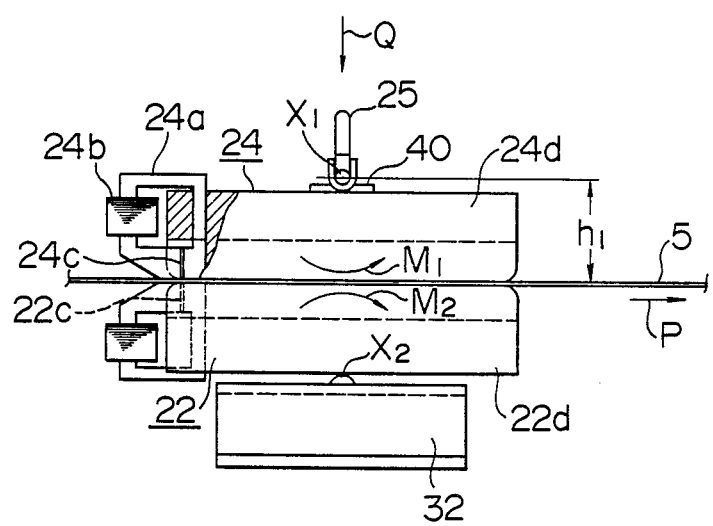
FIG. 7 is a partial cross-sectional view depicting a manner in which turning moments act on the magnetic heads.

For example, in FIG. 7, the second magnetic head 24 has the slider 24d thereof subjected to the turning moment $M_1$ which acts around the support point $X_1$ for the support member 40 in the same direction as the direction of rotation P of the magnetic disk 5. $M_1$ in accordance with the following relationship:

$$M_1 = F_1 \cdot h_1 = \mu_1 \cdot Q \cdot h_1$$

where: $h_1$ represents the height or distance between the surface of the magnetic disk 6 slide-contacted by the slider 24d and the support point $X_1$; Q represents a contact load which is, for example, imposed by the respective weights of the head arm spring 25 and the magnetic head 24; $\mu_1$ represents the coefficient of friction between the slider 24d and the magnetic disk 5; and $F_1$ represents a frictional resistance.

The turning moment $M_1$ acts in such a manner that the forward end of the slider 24d which faces in the direction of rotation P of the magnetic disk 5 is more stable and has better characteristics in terms of the state of contact with the magnetic disk 5 than the other end of the slider 24d. Accordingly, the recording and reproducing gap (head gap) 24c, which is provided on the forward end of the slider 24d, shows excellent recording and reproducing characteristics. It is also possible to obtain advantageous effects in the first magnetic head 22 which are substantially similar to the above.

Although the invention has been described with respect to one preferred embodiment thereof with reference to the accompanying drawings, the relative disposition, configuration, material and so forth of the constituent elements described in relation to the embodiment are only exemplary and do not limit the invention unless otherwise specified.

Additionally, the structure for supporting a magnetic head is not necessarily limited to those in which a magnetic head is pivotally supported such as to be free to pivot in any direction, and the invention may also be applied to supporting structures in which a magnetic head is free to pivot in the rotational direction (pitching direction) of a magnetic disk but is prevented from pivoting in a direction (rolling direction) orthogonal to the rotational direction of the magnetic disk.

As has been described above, according to the present invention, the recording and reproducing gap of each of the two magnetic heads which has a slider and a recording and reproducing gap which slide-contact a magnetic disk and is pivotally supported is disposed on the forward end of the slider in terms of the direction of rotation of the magnetic disk, thereby enabling an improvement in the state of contact between the recording and reproducing gap and the magnetic disk. It is therefore possible to obtain a magnetic head having excellent recording and reproducing characteristics with extremely high reliability.

What is claimed is:

1. A magnetic head supporting apparatus comprising;
   a carriage movable in a direction of a radius of a magnetic disk,
   a head arm mounted on said carriage,
   a first magnetic head mounted on said carriage through a first supporting member,
   a second magnetic head opposing said first magnetic head across said magnetic disk, and mounted on said head arm through a second supporting member,
   a head arm spring mounted on said head arm for pressing said first and second magnetic heads to bring them into contact with said magnetic disk with a predetermined pressure,
   wherein a first slider of said first magnetic head is supported pivotally about a support point of said first supporting member which allows said first slider to pivot about said point on an axis extending radially of said disk, a second slider of said second magnetic head is supported pivotally about a support point of said second supporting member which allows said second slider to pivot about said point on an axis extending radially of said disk, a recording and reproducing head gap of said first magnetic head is disposed on said slider at the forward end of said slider as viewed in a direction of rotation of said magnetic disk, and a recording and reproducing head gap of said second magnetic head is disposed on said slider at the forward end of said slider as viewed in a direction of rotation of said magnetic disk, said first and second sliders making contact with respective disk surfaces to thereby cause said sliders to generate a turning moment about their respective pivot axes whereby a more uniform and stable contact is generated between the respective head gaps and disk surfaces.

* * * * *